United States Patent [19]
Darling et al.

[11] 3,729,720

[45] Apr. 24, 1973

[54] TURNTABLE FOR RIGIDLY MOUNTING THIN FLEXIBLE MAGNETIC DISCS

[75] Inventors: Richard H. Darling, Boca Raton; Ludwig R. Siegl, Delray Beach, both of Fla.

[73] Assignee: International Business Machines Corporation, Armonk, N.Y.

[22] Filed: June 18, 1971

[21] Appl. No.: 154,330

[52] U.S. Cl. ..................340/174.1 E, 179/100.2 A, 179/100.2 E, 346/137

[51] Int. Cl. ..........................................G11b 17/00

[58] Field of Search ................179/100.2 A, 100.2 P; 340/174.1 E; 346/137; 248/362; 272/41.4, 42, 43

[56] References Cited

UNITED STATES PATENTS 3,390,385 6/1968 Ehalt ............................179/100.2 A

*Primary Examiner*—Vincent P. Canney
*Attorney*—John G. Frisone

[57] ABSTRACT

A disc recorder in which the recording medium is carried on a pliant circular sheet which is held in intimate contact, in the active recording area, with a rotating turntable by a pressure differential established by the configuration of a rotating turntable and the operatively positioned pliant disc.

8 Claims, 3 Drawing Figures

INVENTORS
RICHARD H. DARLING
LUDWIG R. SIEGL

BY John B. Dickman
ATTORNEY

TURNTABLE FOR RIGIDLY MOUNTING THIN FLEXIBLE MAGNETIC DISCS

BACKGROUND OF THE INVENTION

The invention relates to magnetic recorders in general and more particularly to magnetic disc recorders in which the magnetic medium is supported on a pliant disc which is in operation firmly adhered by a pressure differential to a rotating turntable.

DESCRIPTION OF THE PRIOR ART

Magnetic recording of digital data has in general been limited to either drums, discs or tapes. Each has its own advantages and disadvantages, and the choice of one over the other depends to a great extent on the application. Drum recorders are capable of high data density and high access time; however, they are expensive to manufacture and not suitable for archival storage of data.

Magnetic tape is comparatively inexpensive and highly suitable for archival storage; however, due to its serial nature, access time is greater than drum storage. Magnetic disc storage falls between the two in that it is comparable in access time to drums and is suitable for archival storage since the discs are readily removed for storage and may be replaced by other discs with or without data recorded thereon. Disc storage devices while less expensive to manufacture than drums are nevertheless precision devices and are costly to manufacture.

Both contact and noncontact recording are employed with disc storage devices. In either case, the disc to head spacing is highly critical and must be maintained within very precise limits. In the case of rigid discs, this requirement imposes severe restraints on manufacturing tolerances which greatly increase the manufacturing cost of the disc. Since the discs are used for archival purposes and a large number are utilized in each machine, any reduction in the manufacturing cost of the disc is highly important since it is multiplied by the number of discs used in each machine.

Many attempts have been made at reducing the cost of the disc since this is a significant cost area. Of these, the most spectacular has been an attempt to utilize the same sheet material from which magnetic tape is slit for the disc. This material is typically a very thin sheet of polyester coated with a suitable magnetic oxide. The sheet material was cut in a circular disc shape with a centrally located mounting hole. The disc thus formed was mounted on a rotatable spindle and spun in proximity to an apertured backer plate. The spinning disc pumped air supplied through the aperture in the backer plate and through the region between the spinning disc and the backer plate. The velocity imparted to the air reduced the pressure in the region between the spinning disc and the backer plate. An equilibrium point is reached, depending on the speed of the disc, the size of the aperture for admitting the air and the nominal spacing of the disc from the backer plate, at which the disc over a substantial region is substantially uniformly spaced from the backer plate. The disc in this region interacts with read/write heads mounted in the backer plate in a noncontact mode. An early example of this type device may be found in U. S. Pat. No. 2,950,353 to S. M. Fomenko. Modifications and variations of the above described pliant or flexible disc are disclosed in U. S. Pat. Nos. 3,153,241; 3,225,338; 3,369,227 and 3,573,771.

The flexible disc magnetic recorders described above achieve a substantial reduction in cost over rigid disc recorders insofar as the disc cost is concerned. However, in operation, they have not proven as reliable or durable. The thin pliable disc is fragile in nature and in operation is subjected to many physical hazards which are capable of damaging or destroying the disc. While the cost of the disc is inconsequential, the data stored thereon may in many instances be extremely valuable and not readily available. In addition, operating factors such as temperature variations and excessive humidity require special enclosures and environmental control in view of the physical characteristics of the supporting or base material.

A technique of fabricating a rigid disc from a polyester sheet having a magnetic oxide bonded thereto is disclosed in U. S. Pat. No. 3,130,110 to Schmidt. According to the patent, a rigid platter or disc supports an annular ring of resilient material and an annular ring of polyester bonded to the platter. The platter assembly is mounted on the disc or platter drive as a unit and is removed as a unit when the data is to be stored. This technique may provide some cost advantages; however, the complex hand-built platter assembly must be duplicated for each record retained for archival purposes.

SUMMARY OF THE INVENTION

The invention contemplates a disc recorder in which a disc shaped, thin sheet carrying a magnetic oxide suitable for use as a digital data recording medium is adhered to a rotatable turntable by a pressure differential created by simultaneously rotating the turntable and the disc. The turntable is provided with a plurality of radial grooves for establishing fluid communication between the central area of the turntable and the periphery of the turntable on the side confronting the disc. The disc formed of the thin sheet material when operatively mounted forms a sealing wall for the grooves. Simultaneous rotation of the table and the disc creates a vacuum in the cavities formed between the disc and the table. The resulting force on the nonconfronting surface of the disc retains the disc in intimate contact with the confronting surfaces of the turntable.

One object of the invention is to provide a rigid disc for the magnetic recording of data which utilizes a thin flexible sheet material for supporting the magnetic recording medium.

Another object is to provide a disc as set forth above in which the supporting sheet is firmly attached to a rigid turntable and readily removable therefrom.

A further object of this invention is to provide a disc as set forth above in which the supporting sheet is attached to the rigid turntable by creating a pressure differential between the opposite sides of the supporting sheet.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
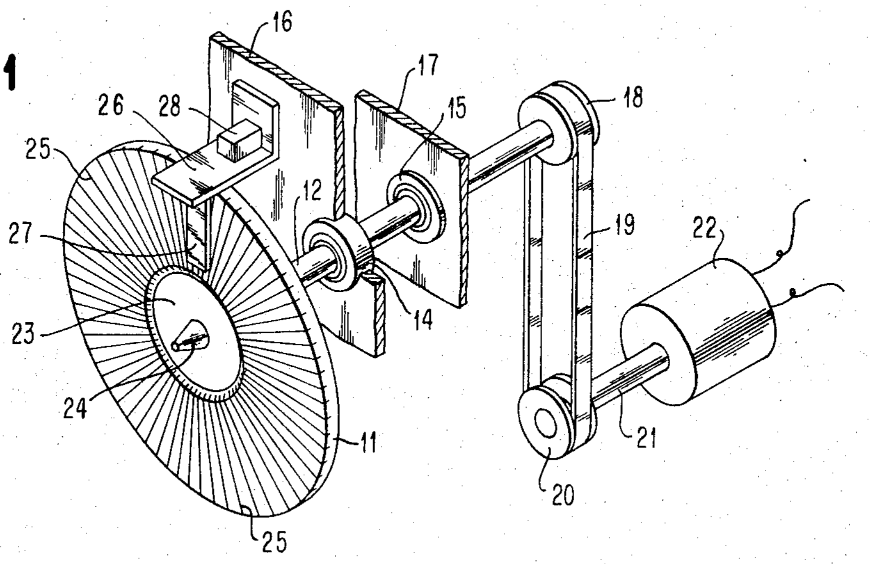
FIG. 1 is a view in perspective of a novel disc recorder constructed in accordance with the invention.

In FIG. 1, a substantially flat turntable 11 (that is having a much larger diameter than thickness in the axial direction) is attached to a shaft 12. The shaft 12 is supported for rotation by two bearings 14 and 15 mounted in fixed supporting members 16 and 17, respectively. A pulley 18 mounted on shaft 12 is connected by a drive belt 19 to a motor pulley 20 mounted on the output shaft 21 of a motor 22. When motor 22 is energized, the resultant rotary motion of output shaft 21 is transmitted via pulley 20, belt 19 and pulley 18 to the shaft 12 and thence to turntable 11.

Figure 2:
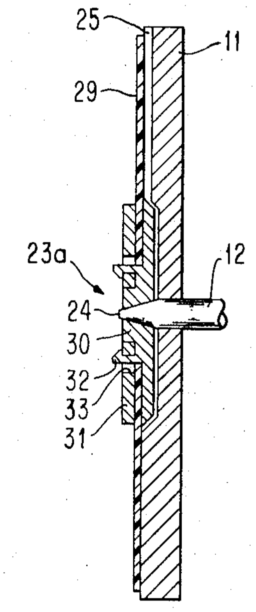
FIG. 2 is a cross-sectional view of the central portion of the turntable with a disc mounted thereon.

The front surface of turntable 11 is provided with a central cavity 23 which provides clearance for a disc mounting hub 23a illustrated in FIG. 2. In addition, a hub locating cone 24 concentric with drive shaft 12 projects beyond the turntable. Locating cone 24 may be formed, as illustrated, on an extension of drive shaft 12 or may alternatively be separately formed and attached to the turntable 11 by any suitable attachment means.

An L shaped bracket 26 mounted on support 16 carries a head mounting support 27 which is arranged on bracket 26 for bidirectional movement in the direction of the axis of shaft 12 under control of a motor 28 for bearing the head or heads into operative association with the magnetic recording medium. The head arrangement and the support and drive for head support 27 are not shown in detail since they do not constitute part of the invention and may take many well known forms. They are illustrated merely to indicate how the turntable 11 and the flexible disc supported thereon interact in a complete device.

The flexible disc 29, FIG. 2, has not been illustrated in FIG. 1 in order to adequately illustrate the details of turntable 11. In addition to the central cavity 23, turntable 11 includes a plurality of grooves 25 oriented in a radial direction which provides fluid communication between the cavity 23 and the periphery of turntable 11. The grooves 25 are substantially uniformly spaced in the flat front surface of the turntable. In a model constructed and successfully operated, 72 grooves were formed in an 8-inch turntable. The slots extended inwardly approximately two and one-half inches from the periphery and were approximately one thirty-second inches wide by three thirty-second inches deep. The above dimensions are not critical and may be varied over a substantial range when the flexible disc material and thickness are varied. The turntable described above was used with a magnetic oxide coated polyester disc having a diameter of approximately 7 ½ inches and a nominal thickness of approximately seven-thousandths of an inch.

Turntable 11 is constructed and formed as described above so as to be impervious to fluid passage from the front to back surfaces. Thus, shaft 12 where it passes through and is attached to turntable 11 must be sealed thereto so as to prevent fluid passage from front to rear. In addition, cavity 23 and grooves 25 are formed in the front surface only and do not permit fluid passage from front to back.

The disc 29 is illustrated in the mounted or operative position in FIG. 2. It is clamped between an inner member 30 of hub 23*a* and an outer member 31. The inner member 30 includes a plurality of fingers 32 which project in the axial direction. These fingers extend from a circular shoulder which positions and locates the disc in cooperation with a central opening formed in the disc. The fingers 32 pass through openings 33 in outer member 31 and retain the outer member in a clamping arrangement to position and hold disc 29. The inner member 30 is provided with a conical opening for mounting the hub on locating cone 24. Once the disc 29 is inserted in the mounting hub 23*a*, the hub may be positioned on locating cone 24 for operation.

Figure 3:
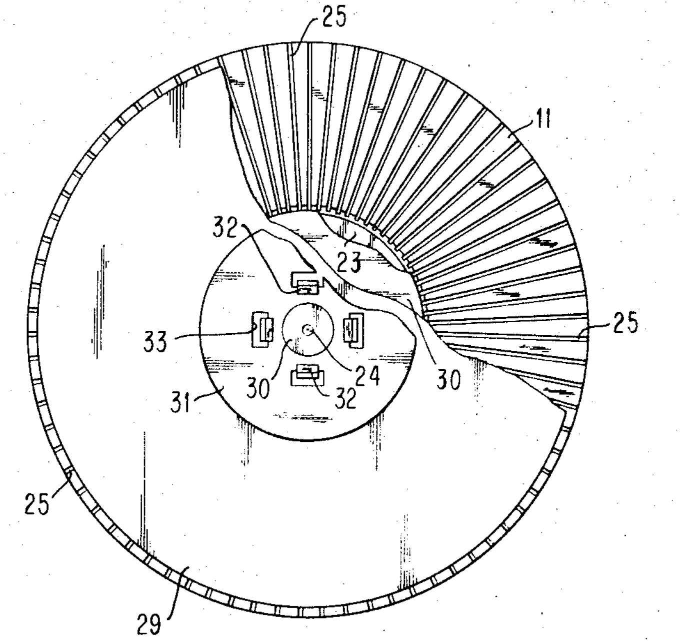
FIG. 3 is a front elevation of the turntable with an operative mounted disc in which a portion of the disc is broken away to reveal part of the turntable structure.

FIG. 3 is an additional view of the structure previously described and combined therewith should be most useful in defining the construction of both the turntable 11 and mounting hub 23*a*.

In operation, the disc 29 is clamped between the inner and outer members 30 and 31 of mounting hub 23*a* and the hub 23*a* and disc 29 are placed on the locating cone 24. As the turntable 11 and disc 29 spin under control of motor 22 and the intermediate drive mechanisms, a vacuum is created in the space between the confronting surfaces of disc 29 and turntable 11 due to the centrifugal pumping action of the walls forming grooves 25. The vacuum thus created establishes a pressure differential between the surfaces of disc 29 causing it to adhere to turntable 11 thus forming a rigid disc structure in combination with turntable 11 which combination may be utilized as any other rigid disc structure. While the turntable 11 is a precision device, only one is required per machine and the very inexpensive flexible disc is firmly bonded thereto during operation. It is, however, easily removed and not subjected to the hazards of contact with recording heads or other structure until it is safely bonded by the described pressure differential to the turntable.

While the invention has been particularly shown and described with reference to a preferred embodiment thereof, it will be understood by those skilled in the art that various changes in form and details may be made therein without departing from the spirit and scope of the invention.

What is claimed is:

1. A turntable suitable for rigidly mounting for rotation a magnetic recording medium supported on a thin flexible disc comprising:

a substantially flat circular member having a diameter substantially larger than the separation between the two substantially planar side surfaces of the member;

means located on one side of said circular member for supporting said circular member for rotation about an axis in alignment with the center of the circular member;

means centrally located on the other substantially planar side surface of the circular member for supporting for rotation therewith a thin flexible disc in concentric spaced relationship with the said other substantially planar side surface; and fluid pumping means located within the circular member for establishing at least a partial vacuum between the said other substantially planar side surface of the circular member and an operatively mounted thin flexible disc when the circular member is rotated.

2. A turntable as set forth in claim 1 in which said fluid pumping means located within the circular member comprises a plurality of spaced radially oriented grooves formed in the said other substantially planar side surface of the said circular member.

3. A turntable as set forth in claim 1 in which the means for supporting a thin flexible disc includes:

a substantially conical member attached to and aligned with the axis of the circular member;

a first hub member having a central substantially conical aperture therethrough for mounting on the conical member and a plurality of fastening means; and a second hub member cooperating with the said fastening means on the first hub member for clamping a thin flexible disc therebetween.

4. A turntable as set forth in claim 3 in which the said other substantially planar side surface of the circular member is provided with a centrally located cavity extending radically at least as far as the first hub member to position a clamped disc in substantial contacting alignment with the substantially planar side surface of the circular member and the grooves in the said other surface provide fluid communication between the cavity and the periphery of the circular member.

5. A rigid magnetic recording disc suitable for use in data recorders comprising:

a rigid circular turntable having a diameter substantially larger than the separation between the two substantially planar side surfaces of the turntable;

means attached to one side of the turntable for supporting said turntable for rotation about its axis;

a thin flexible disc having a central opening therein and a coating of magnetic recording material on at least one side thereof;

means for supporting said flexible disc in the region surrounding the central opening therethrough in concentric spaced relationship with the other substantially planar surface of the turntable; and fluid pumping means located within the turntable for establishing at least a partial vacuum between the said other substantially planar side surface of the turntable and the confronting surface of the thin flexible disc when the turntable is rotated whereby the thin flexible disc is rigidly bonded to the turntable by the pressure differential established by the fluid pumping means within the rotating turntable.

6. A magnetic recording disc as set forth in claim 5 in which said fluid pumping means located within the turntable comprise a plurality of spaced radially oriented grooves formed in the said other substantially planar side surface of the said turntable.

7. A magnetic recording disc as set forth in claim 6 in which the means for supporting the thin flexible disc includes:

a substantially conical member attached to and aligned with the rotational axis of the turntable;

a first hub member having a central substantially conical aperture therethrough for mounting on the conical member and a plurality of fastening means; and a second hub member cooperating with the said fastening means on the first hub member for clamping the thin flexible disc therebetween.

8. A magnetic recording disc as set forth in claim 7 in which the said other substantially planar side surface of the turntable is provided with a centrally located cavity extending radially at least as far as the first hub member to position the clamped flexible disc in substantial contacting alignment with the substantially planar side surface of the circular member and the grooves in the said other surface provide fluid communication between the cavity and the periphery of the turntable.

* * * * *

PO-1050
(5/69)

UNITED STATES PATENT OFFICE
CERTIFICATE OF CORRECTION

Patent No. 3,729,720 Dated April 24, 1973

Inventor(s) Richard H. Darling and Ludwig R. Siegl

It is certified that error appears in the above-identified patent and that said Letters Patent are hereby corrected as shown below:

In the References Cited Section (56), the following patents should be added:

| | | |
|---|---|---|
| -- 3,369,227 | 2/68 | Boissevain |
| 3,110,889 | 9/63 | Morley et al |
| 3,178,719 | 4/65 | Shapiro |
| 2,950,353 | 8/60 | Fomenko |
| 3,537,083 | 10/70 | Voth --. |

Signed and sealed this 24th day of September 1974.

(SEAL)
Attest:

McCOY M. GIBSON JR.
Attesting Officer

C. MARSHALL DANN
Commissioner of Patents